INVENTOR.
EUGENE R. ZIEGLER
BY
W. E. Finken
HIS ATTORNEY

March 20, 1962 — E. R. ZIEGLER — 3,025,554
WINDSHIELD WIPER MECHANISM
Filed Feb. 5, 1960 — 2 Sheets-Sheet 2
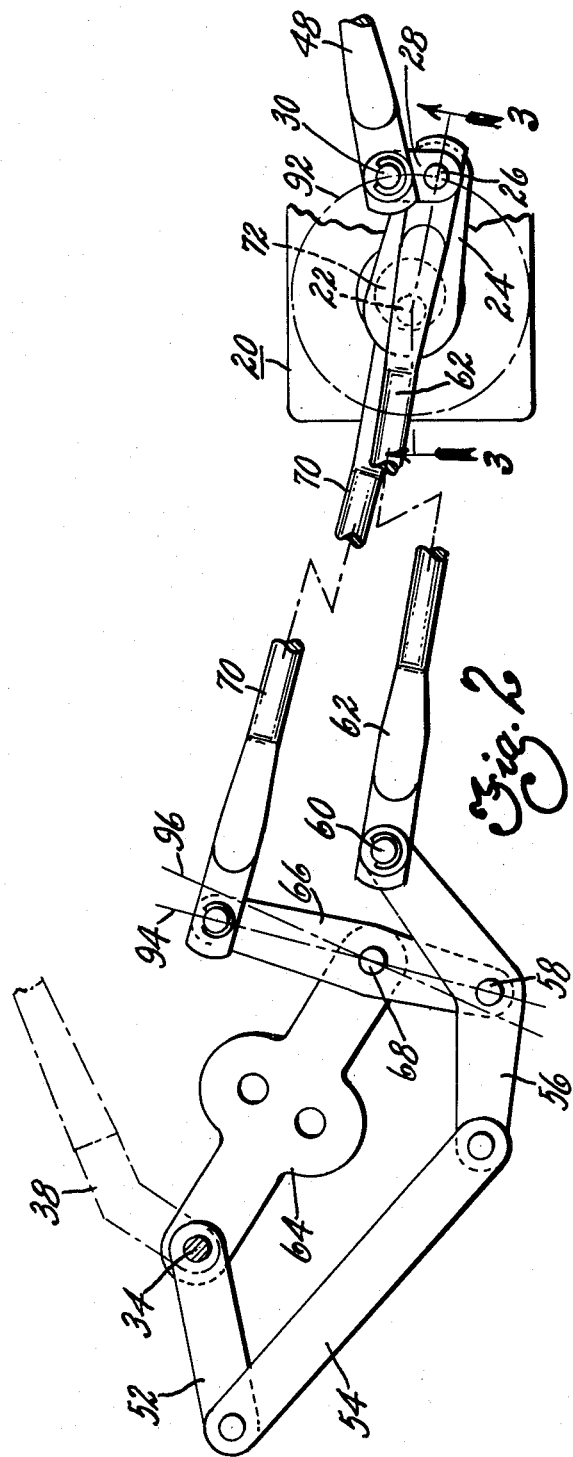
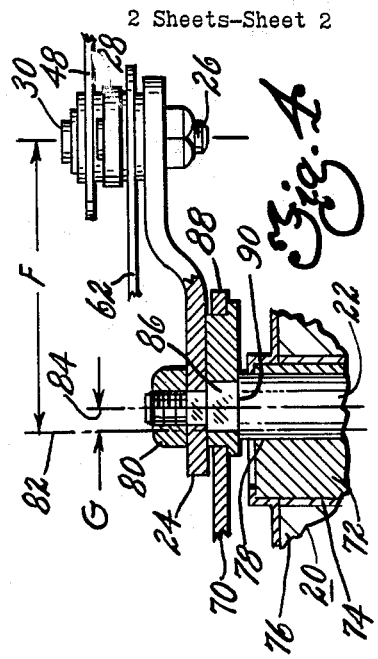
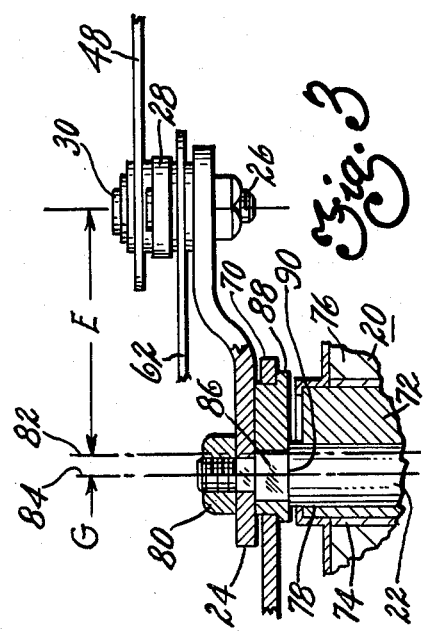
INVENTOR.
EUGENE R. ZIEGLER
BY
HIS ATTORNEY

United States Patent Office 3,025,554
Patented Mar. 20, 1962

3,025,554
WINDSHIELD WIPER MECHANISM
Eugene R. Ziegler, Spencerport, N.Y., assignor to General Motors Corporation, Detroit, Mich., a corporation of Delaware
Filed Feb. 5, 1960, Ser. No. 7,038
7 Claims. (Cl. 15—250.17)

This invention pertains to wiper mechanisms, and particularly to an improved drive mechanism for asymmetrically oscillated wiper blades having overlapping wiping paths adjacent their inboard stroke ends.

At the present time, some vehicles are equipped with a windshield cleaning system having overlapping blades which are actuated by drive mechanism of the type disclosed in copending application Serial No. 756,097, filed August 20, 1958, in the name of Robert M. Fox et al., and assigned to the assignee of this invention. With this drive mechanism, the two wiper blades are oscillated through strokes of unequal angular extent and have their inboard stroke ends angularly offset during running operation, and the two blades are moved through different parking angles to depressed parked positions during parking operation. The present invention relates to an improved drive mechanism for the upper wiper blade which assures more uniform depressed parking of the wiper blades. Accordingly, among my objects are the provision of improved mechanism for asymmetrically oscillating a pair of wiper blades having overlapping wiping paths; and the further provision of a multiplier linkage arrangement effecting uniform parking of the upper wiper blade.

The aforementioned and other objects are accomplished in the present invention by incorporating an offset crank assembly in the drive mechanism in combination with a multiplier linkage for obtaining precise differential parking angles of the two wiper blades. Specifically, the disclosed wiper mechanism is driven by a unidirectional electric motor having a variable throw crank assembly of the type disclosed in copending application Serial No. 718,789, filed March 3, 1958, in the name of Peter R. Contant et al. and assigned to the assignee of this invention. Thus, the motor drive includes eccentric means for shifting the axis of a rotary crank shaft after substantially arresting rotation of the crank shaft so as to increase the throw of the crank assembly during parking operation.

The rotary crank assembly comprises a shaft having a crank arm rigidly attached thereto and carrying a crank pin at its outer end. The shaft is eccentrically journalled in the rotatable hub of a driving member. A second crank arm is attached to the first crank pin and oriented at a fixed angle relative thereto, the second crank arm carrying a second crank pin. The two crank arms constitute an offset crank assembly, the crank pins of which are located on the same side of the axis of the crank shaft. The inner ends of a pair of connecting links are rotatably connected to the two crank pins, the outer end of the link for the driver's wiper being universally connected to a crank arm attached to the pivot shaft for the driver's wiper. The outer end of the other link is universally connected to one end of a reversing link, or bellcrank, having an intermediate pivot. The other end of the reversing link is rotatably connected to one end of a connecting arm, the other end of which is rotatably connected to a crank arm attached to the pivot shaft for the passenger's wiper. The reversing link in the linkage for the passenger's wiper reverses the motion so that the two pivot shafts will be oscillated asymmetrically during rotation of the crank assembly.

The crank shaft has an eccentric bearing rigidly connected thereto. One end of a parking link is rotatably supported on the bearing, the other end of the parking link being pivotally connected to a second bellcrank having a fixed intermediate pivot. The intermediate pivot for the first bellcrank is carried by the other end of the second bellcrank.

During running operation wherein the crank shaft is connected to rotate with the driving member about the axis of the hub, the eccentric bearing rotates with the crank shaft. The axis of the eccentric bearing is in alignment with the axis of the hub. Accordingly, during running operation the parking link is not moved to and fro but remains stationary, and therefore the intermediate pivot for the first bellcrank remains stationary. However, during parking operation rotation of the crank shaft and the bearing is arrested while the driving member continues to rotate. Continued rotation of the driving member and the hub relative to the crank shaft results in shifting the crank shaft and the eccentric bearing. This shifting movement of the crank shaft increases the throw of the offset crank assembly whereby the two wiper blades will be moved throughout a predetermined angle beyond their running inboard stroke end limits. In addition, the shifting movement of the eccentric bearing simultaneously reciprocates the parking link which adjusts the position of the intermediate pivot on the first bellcrank thereby resulting in further movement of the upper, or passenger's wiper blade beyond its running inboard stroke end limit. In the disclosed embodiment, the parking link and second bellcrank operate as a two to one multiplier linkage so that the parking stroke through which the passenger's wiper blade is moved is twice the parking stroke through which the driver's wiper blade is moved.

Further objects and advantages of the present invention will be apparent from the following description, reference being had to the accompanying drawings, wherein a preferred embodiment is clearly shown, and wherein similar numerals depict similar parts throughout the several views.

In the drawings:

FIGURE 2 is a fragmentary view, in elevation, of the drive linkage for the upper, or passenger's, wiper blade in the running inboard stroke end limit.

FIGURE 3 is an enlarged fragmentary view, partly in section and partly in elevation, taken along line 3—3 in FIGURE 2.

FIGURE 4 is a view similar to FIGURE 3 with the mechanism in the parked position.

Figure 1:
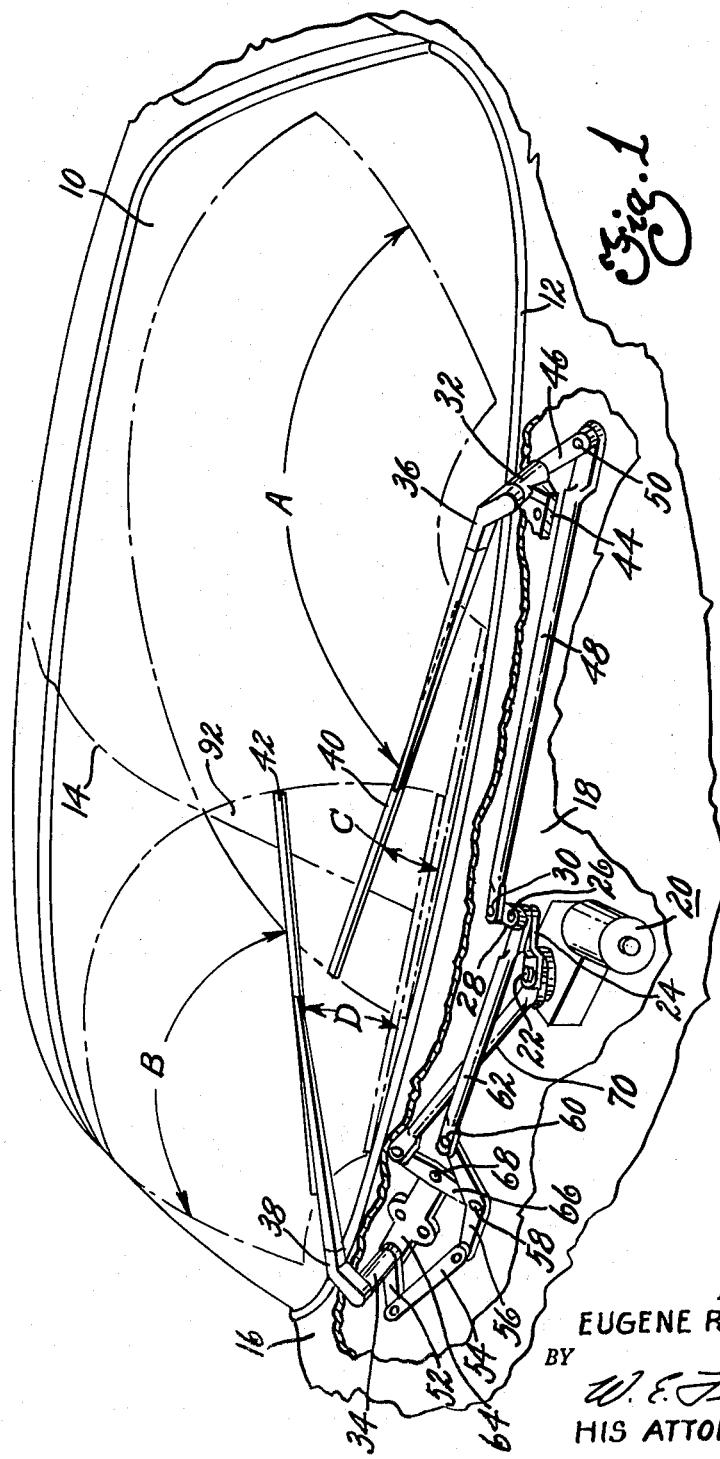
FIGURE 1 is a fragmentary, perspective view, partly in section and partly in elevation, of a vehicle equipped with the improved drive mechanism of this invention.

With particular reference to FIGURE 1, a portion of a vehicle is shown including a wrap around windshield 10 having a lower reveal molding 12. The center of the windshield is indicated by a broken line 14. The vehicle includes a cowl 16 and a firewall 18, an electric motor driven wiper unit being suitably secured to the firewall 18.

The electric motor driven wiper unit is of the general type disclosed in the aforementioned copending application Serial No. 718,789 and thus includes a rotary crank shaft 22 which is arranged substantially vertically in the vehicle and has a first crank arm 24 drivingly connected thereto. The first crank arm 24 carries a crank pin 26 at its outer end to which a second crank arm 28 is connected and oriented at a fixed angle to the first crank arm 24. The second crank arm 28 likewise carries a crank pin 30 adjacent its outer end.

A pair of spaced pivot shafts 32 and 34 project through the cowl 16, wiper arms 36 and 38 being drivingly connected to pivot shafts 32 and 34, respectively. The wiper arms 36 and 38 include spring-hinge connected inner and outer sections, the outer sections of which carry wiper blades 40 and 42, respectively. The blade 40 constitutes the driver's blade, and the blade 42 constitutes the passenger's blade.

The pivot shaft 32 is supported in a bracket 44 attached to the cowl. A crank, or drive, arm 46 is connected to the inner end of the pivot shaft 32. A reciprocable connecting link 48 has one end connected through a ball and socket joint 50 to the drive arm 46, and the other end rotatably supported on the crank pin 30. The pivot shaft 34 is attached to one end of a crank, or drive, arm 52, the other end of which is pivotally connected to one end of a connecting arm 54. The other end of the arm 54 is pivotally connected to one end of a bellcrank, or reversing link, 56 having an intermediate pivot 58. The other end of the bellcrank 56 is connected through a ball and socket joint 60 to one end of a second reciprocable link 62. The other end of the reciprocable link 62 is rotatably connected to the crank pin 26. The pivot shaft 34 is supported in a bracket 64 attached to the cowl 16. A lever 66 has an intermediate pivot at 68 carried by the bracket 64. One end of the lever 66 carries the pivot 58 for the bellcrank 56. The other end of the lever 66 is connected to one end of a parking link 70.

With particular reference to FIGURES 2 and 3, the electric motor driven wiper unit 20 includes a driving member having a hub 72 journalled by a bearing 74 in a housing 76. The hub 72 has an eccentric through bore 78 within which the crank shaft, or driven element, 22 is rotatably supported. As seen in FIGURE 3, the first crank arm 24 is held in assembled relation with the crank shaft 22 by a nut 80. During running operation, the shaft 22 is connected to rotate with the hub 72 about the axis thereof. The axis of the hub 72 is depicted by broken line 82, while the axis of the shaft 22 is depicted by a broken line 84.

The crank shaft 22 has a pair of flats thereon, one of which is depicted by numeral 86. An eccentric bearing 88 having an opening complementary to the portion of the shaft having the flats, one of which is indicated by numeral 86, is disposed between the first crank arm 24 and a shoulder 90 on the shaft so as to be drivingly connected with the shaft 22. The eccentric bearing 88 is circular and has its axis in alignment with the axis 82 of the hub 72. The inner end of the parking link 70 is rotatably mounted on the periphery of the bearing 88.

During running operation, the wiper arms 36 and 38 and the blades 40 and 42 carried thereby are asymmetrically oscillated, or oscillated in phase opposition. The geometry of the drive linkage is such that the driver's blade 40 is oscillated throughout an angle A which may be on the order of 100°, while the passenger's blade 42 is oscillated throughout an angle B which may be on the order of 90°, during running operation. Moreover, the inboard stroke end limits of the wiper blades 40 and 42 are angularly offset, as clearly shown in FIGURE 1, wherein the blades 40 and 42 are shown at their running inboard stroke end limit positions. The lengths of the arms and the blades, and the distance between the pivot shafts 32 and 34 is such that during running operation, the paths of the wiper blades 40 and 42 overlap adjacent their inboard stroke ends in the area depicted by numeral 92 in FIGURE 1. When the wiper blades 40 and 42 are moved to their depressed parked positions, with the wiper blade 40 in firm engagement with the lower reveal molding 12, the wiper blade 42 overlaps and firmly engages a portion of the wiper blade 40, as depicted by the dotted lines in FIGURE 1.

In order to accomplish this depressed parking operation, the blades 40 and 42 must be moved through different parking angles. For example, the blade 40 must be moved through a parking angle C of approximately 10° while the blade 42 must be moved throughout a parking angle D of approximately 20°.

In order to move the wiper blades 40 and 42 through parking strokes of different angular extent, the throw of the offset crank assembly comprising crank arms 24 and 28, is increased, and in addition, the linkage comprising parking link 70 and lever 66 is adjusted. The linkage comprising parking link 70, lever 66 and the adjustable pivot 58 for the bellcrank 56 comprises a two to one multiplier linkage. During running operation, the shaft 22 rotates with the hub 72, and as crank pins 26 and 30 are equally radially spaced from the axis 82, the crank pins 26 and 30 rotate in a path indicated by the circle depicted by numeral 92 in FIGURE 2. During parking operation, which is automatically effected upon manual manipulation of the wiper control switch to the "off" position, rotation of the shaft 22 is arrested with the crank pins 26 and 30 in the position depicted in FIGURE 2, namely the running inboard stroke end limit position. The driving member and the hub 72 continues to rotate, which rotation throughout 180°, shifts the position of shaft 22 from one side of the center 82 of the hub 72 to the other side thereof, as seen in FIGURE 4.

By shifting the position of the shaft 22, the radial distance between the crank pins 26 and 30 and the axis 82 is increased from the distance E as seen in FIGURE 3 to the distance F as seen in FIGURE 4. The distance E is equal to the distance E plus twice the distance G, which is the distance between the axes 82 and 84 as seen in FIGURES 2 and 3. This increase in the radius, or throw, of the crank pins 26 and 30 is sufficient to move the wiper blades 40 and 42 throughout an angle of 10° beyond their running inboard stroke end positions. Accordingly, the blade 40 will be moved into firm engagement with the lower reveal molding 12.

During relative rotation between the shaft 22 and the hub 72, so as to shift the shaft 22 laterally, movement is imparted to the parking link 70 by the bearing 88 since the bearing 88 moves with the shaft 22. As clearly seen by comparing FIGURES 3 and 4, the bearing 88 has been shifted to the right with the shaft 22 thereby moving the link 70 to the right so as to pivot the lever 66 in the clockwise direction about intermediate pivot 68 from the position depicted by line 94 to the position depicted by line 96 in FIGURE 2. Clockwise angular movement of the lever 66 about the pivot 68 will shift the position of the pivot 58 for the bellcrank 56 and thereby multiply the angular movement imparted to the wiper blade 42. Since, as alluded to hereinbefore, the linkage effects a two to one multiplication, the blade 42 will be moved throughout a parking angle of 20° and thus firmly engage a portion of the blade 40.

During running operation of the wiper blades, the driver's blade 40 traverses the overlapped area of the windshield substantially ahead of the wiper blade 42. However, oscillation of the wiper blades is substantially synchronized, since blades 40 and 42 both arrive at their running inboard and outboard stroke end positions substantially simultaneously. In this manner, interference between the blades 40 and 42 is precluded. During parking operation, the blade 40 moves into engagement with the lower reveal molding 12 before the blade 42 engages the blade 40. When the wiper motor is initially energized the wiper blade 42 moves out of engagement with the wiper blade 40 during rotation of the hub 72 relative to the shaft 22 from the position of FIGURE 4 to the position of FIGURE 3 which movement simultaneously repositions the pivot 58 of the reversing link 56, whereas the shaft 22 is again drivingly connected for rotation with the hub 72 about the axis 82.

While the embodiment of the invention as herein disclosed constitutes a preferred form, it is to be understood that other forms might be adopted.

What is claimed is as follows:

1. A linkage drive for imparting asymmetrical oscillation to a pair of spaced pivot shafts from a rotary drive member having crank means on only one side of the axis thereof, including, a pair of connecting links having their inner ends rotatably connected to said crank means, a pair of spaced pivot shafts, a drive arm attached to each pivot shaft, the outer end of one of said connecting links being operatively connected with one of said drive arms, one of said connections including a motion reversing link having an intermediate pivotal support, the outer end of the other connecting link being operatively connected to one end of said reversing link, an arm operatively interconnecting the other end of said reversing link and said other drive arm whereby rotation of said crank means will impart asymmetrical oscillation to said pivot shafts, a lever having a fixed intermediate pivotal support, the pivotal support for said reversing link being carried by one end of said bellcrank, and a reciprocable element operatively connected to the other end of said lever whereby simultaneous reciprocable movement of said element and said other connecting link will vary the amplitude of oscillation of the pivot shaft actuated through said reversing link.

2. A linkage drive for imparting asymmetrical oscillation to a pair of spaced pivot shafts from a rotary driving member having crank means on only one side of the axis thereof, including, a pair of connecting links having their inner ends rotatably connected to said crank means, a pair of spaced pivot shafts, a drive arm attached to each pivot shaft, the outer end of one of said connecting links being operatively connected with one of said drive arms, a motion reversing link having an intermediate pivotal support, the outer end of the other connecting link being operatively connected to one end of said reversing link, an arm operatively interconnecting the other end of said reversing link and the other drive arm whereby rotation of said crank means will impart asymmetrical oscillation of said pivot shafts throughout strokes of predetermined angular extent, a lever having a fixed intermediate pivotal support, the pivotal support for said reversing link being carried by one end of said lever, and a reciprocable element operatively connected to the other end of said lever whereby simultaneous reciprocable movement of said element and said other connecting link will increase the angular extent of the stroke of the pivot shaft actuated through said reversing link.

3. Cleaning mechanism for a vehicular windshield including a pair of oscillatable wiper blades, said wiper blades being movable throughout running strokes and to depressed parked positions beyond the inboard stroke end limits of their running strokes, said wiper blades being arranged to have overlapping paths adjacent the central portion of the windshield during their running strokes and having their inboard stroke end limits angularly offset with respect to each other, means for imparting asymmetrical oscillation to said wiper blades throughout their running strokes, and means including a reciprocable parking link operatively associated with one of said wiper blades for moving said wiper blades throughout parking strokes of different angular extent to their depressed parked positinos.

4. Cleaning mechanism for a vehicular windshield including, a pair of oscillatable wiper blades, said wiper blades being movable throughout running strokes and to depressed parked positions beyond the inboard stroke end limits of their running strokes, said wiper blades being arranged to have overlapping paths adjacent the central portion of said windishield during their running strokes and having their inboard stroke end limits angularly offset with respect to each other, a rotary driving member, a driven element eccentrically supported for rotation by said driving member, a first rotary crank drivingly connected to said driven element, a second rotary crank drivingly connected to said first crank, means operable to rotate said driving member to rotate said driven element about the axis of said driving member, said first and second cranks being driven by said driven element with the throws thereof maintained substantially constant, means interconnecting said cranks and said wiper blades for imparting asymmetrical oscillation to said wiper blades throughout their running strokes, and means including a reciprocable parking link operatively associated with one of said wiper blades for moving said wiper blades through parking strokes of different angular extent to their depressed parked positions upon relative rotation between said driving member and said driven element.

5. The combination set forth in claim 4 wherein the means interconnecting said cranks and said wiper blades comprise a pair of connecting links having their inner ends rotatably connected to said cranks, a pair of spaced pivot shafts operatively connected to said wiper blades, a drive arm connected to each pivot shaft, the outer end of one of said connecting links being operatively connected to one of said drive arms, a connecting arm having one end rotatably connected to the other of said drive arms, and a reversing link having an intermediate pivotal support, the other end of said connecting arm being rotatably connected to one end of said reversing link, the other end of the other connecting link being operatively connected to the other end of said reversing link.

6. The combination set forth in claim 5 including, a lever having a fixed intermediate pivotal support, the pivotal support for said reversing link being carried by one end of said lever, and wherein said reciprocable parking link is operatively connected to the other end of said lever.

7. The combination set forth in claim 6 including, an eccentric member connected to said driven element, and wherein the other end of said parking link is journalled on said eccentric member, the axis of said eccentric member being in alignment with the axis of said driving member.

References Cited in the file of this patent

UNITED STATES PATENTS

| | | |
|---|---|---|
| 2,691,186 | Oishei et al. | Oct. 12, 1954 |
| 2,857,611 | Oishei et al. | Oct. 28, 1958 |